United States Patent [19]

Yagasaki et al.

[11] Patent Number: 5,226,174
[45] Date of Patent: Jul. 6, 1993

[54] CHARACTER RECOGNITION SYSTEM FOR DETERMINING A CLASS OF SIMILARITY BASED ON COMPUTER DISTANCE WITH A SMALLEST VALUE INDICATING CLOSE SIMILARITY

[75] Inventors: Toshiaki Yagasaki, Hino; Shugoro Ueno, Tokyo; Tetsuomi Tanaka, Yokohama, all of Japan

[73] Assignee: Canon Kabushiki Kaisha, Tokyo, Japan

[21] Appl. No.: 893,882

[22] Filed: Jun. 4, 1992

Related U.S. Application Data

[63] Continuation of Ser. No. 440,381, Nov. 22, 1989, abandoned.

[30] Foreign Application Priority Data

Nov. 25, 1988 [JP] Japan .................. 63-297293

[51] Int. Cl.$^5$ .......... G06F 7/00; G06F 7/08; G06F 7/20
[52] U.S. Cl. .................. 395/800; 364/926.8; 364/DIG. 2
[58] Field of Search .......... 395/800, 425, 375

[56] References Cited

U.S. PATENT DOCUMENTS

| | | | |
|---|---|---|---|
| 3,714,634 | 1/1973 | Draks et al. | 364/172.5 |
| 4,582,417 | 4/1986 | Yagasaki et al. | 355/7 |
| 4,611,280 | 9/1986 | Linderman | 364/300 |
| 4,679,139 | 7/1987 | Durbin | 364/200 |
| 4,823,192 | 4/1989 | Shimizu et al. | 358/256 |
| 4,851,854 | 6/1989 | Drogin | 342/417 |

FOREIGN PATENT DOCUMENTS 57-025079 5/1982 Japan .

OTHER PUBLICATIONS

IEEE Transactions on Computers, "A Special-Function Unit for Sorting and Sort-Based Database Operations", L. Raschid et al., vol. C-35, Dec. 1986, No. 12, pp. 1071–1077.

*Primary Examiner*—Thomas C. Lee
*Assistant Examiner*—Alpesh M. Shah
*Attorney, Agent, or Firm*—Fitzpartick, Cella, Harper & Scinto

[57] ABSTRACT

This invention provides a sorting method and apparatus, in which identification codes and numeric information to be sorted assigned to these identification codes are entered. When there are a plurality of identification codes having equal numeric information, a first one of these identification codes is written in a first memory at an address corresponding to the numeric information. Next, if there is an identification code from a second identification code onward having numeric information equal to the abovementioned numeric information, this identification code is written in a second memory at an address corresponding to the previously entered identification code. The identification codes thus stored are read out in the order of the addresses of the first memory. When the first identification code has been stored at an address of the first memory, identification codes from the second onward having numeric information the same as that of this identification code are read out of the second memory, with the stored identification code serving as a read starting address of the second memory and the identification code read from the read starting address serving as the next read address.

9 Claims, 6 Drawing Sheets

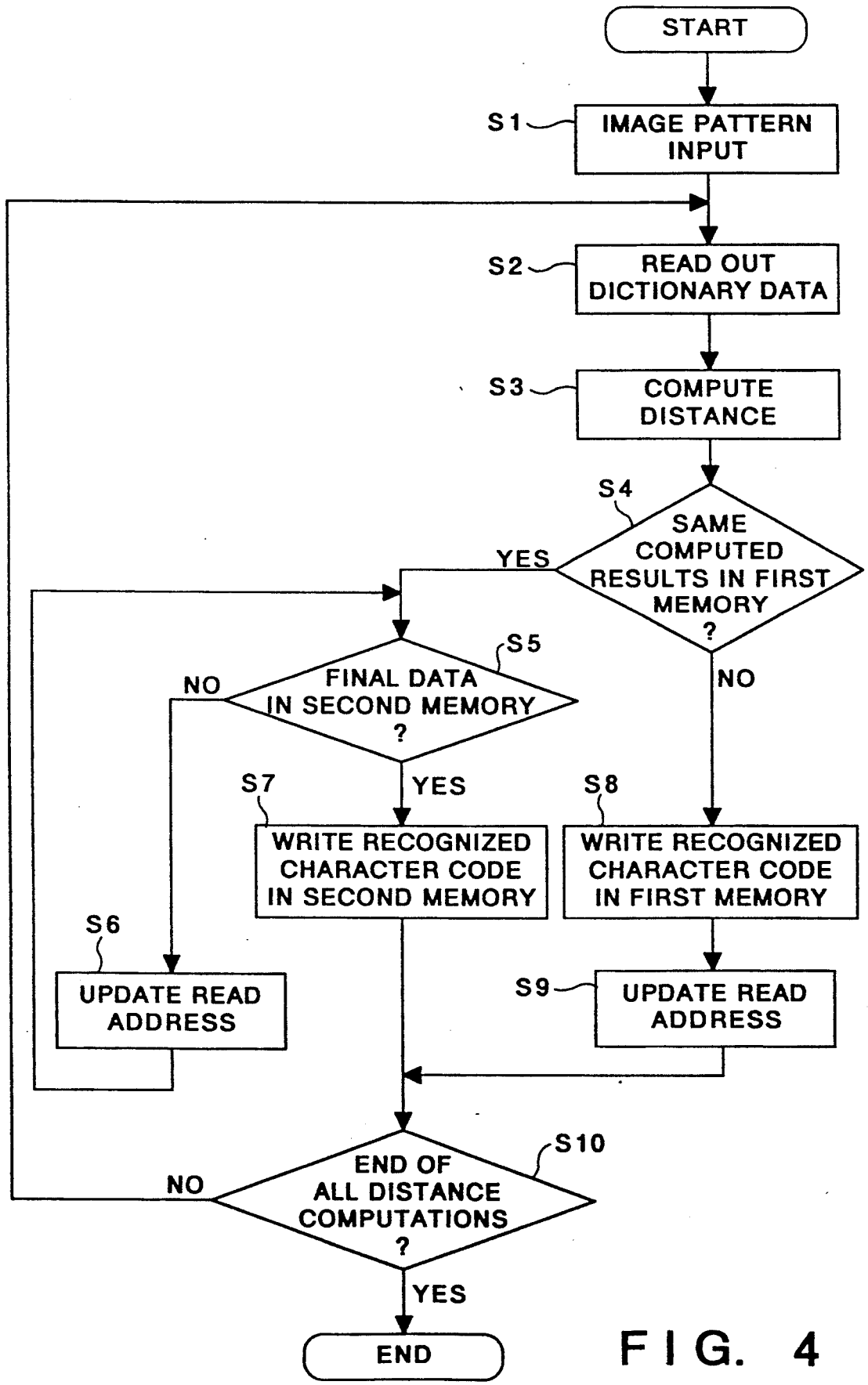
F I G. 4

CHARACTER RECOGNITION SYSTEM FOR DETERMINING A CLASS OF SIMILARITY BASED ON COMPUTER DISTANCE WITH A SMALLEST VALUE INDICATING CLOSE SIMILARITY

This application is a continuation of application Ser. No. 07/440,381 filed Nov. 22, 1989, now abandoned.

BACKGROUND OF THE INVENTION

1. Field of the Invention

This invention relates to a sorting method and apparatus for sorting numerical data inputted in a time series and identifiers corresponding to the numerical data in the order of the size of the numerical data.

2. Description of the Prior Art

In a character recognition apparatus according to the prior art, an input image pattern obtained by an image pick-up device generally is subjected to a distance computation (comparison) with respect to standard patterns of respective characters stored beforehand in an internal memory, the one standard pattern which most closely approximates the input image pattern (namely the standard pattern having the shortest distance) is extracted based on the results of the computation, and a character code corresponding to the extracted standard pattern is outputted as the results of character recognition of the input image pattern.

FIG. 6 illustrates an example of the simplified arrangement of such a conventional character recognition apparatus.

As shown in FIG. 6, an image pattern (input image pattern) enters from a scanner (an image pick-up device or image reader) 1 via a scanner interface 2 and is written in an image memory 3 by a central processing unit (CPU) 4.

Next, the input image pattern stored in the image memory 3 is read out under the control of the CPU 4 and sent to an arithmetic circuit 5-2 of an identification circuit 5.

A dictionary memory 5-1 stores various character codes and standard image patterns corresponding to these character codes. The arithmetic circuit 5-2 performs a distance computation to compute the distance between the input image pattern from the image memory 3 and the standard image patterns in the dictionary memory 5-1.

This distance computation is performed by comparing each of the plurality of standard image patterns with the single input image pattern, thereby obtaining computation results (distance data) regarding each standard image pattern.

A memory 5-4 for storing the results of identification constitutes a sorting circuit. The memory 5-4 stores the identifier of the relevant standard pattern, namely the character code, at an address corresponding to the results of distance computation (distance data) received from the arithmetic circuit 5-2 via a write circuit 5-3. The write circuit 5-3 also constitutes the sorting circuit.

The character codes stored in the memory 5-4 are read out by the CPU 4 in the order of the addresses, namely in order from the smaller to the larger distances. These character codes are displayed on a CRT display unit 7 via a CRT interface (I/F) 6. The smaller the distance, the closer the standard image pattern of the corresponding code approximates the input image pattern.

The factual operation of this sorting circuit will now be described in simple terms.

When an image pattern of one character initially enters from the scanner 1, this input image pattern is sent to the arithmetic circuit 5-2 via the image memory 3. The arithmetic circuit 5-2 computes the distance between this input image pattern and the standard image pattern of the first character, e.g., "A", stored in the dictionary memory 5-1, and the write circuit 5-3 stores the character code of the character "A" at an address in the memory 5-4 corresponding to the distance data, which is the result of distance computation.

Next, the arithmetic circuit 5-2 reads the standard image pattern of the next character "B" out of the dictionary memory 5-1 and performs a distance computation with regard to the input image pattern, just as in the case of the character "A". The write circuit 5-3 stores the character code of the character "B" at an address in the memory 5-4 corresponding to the distance data regarding the standard image pattern of character "B".

By thenceforth repeating this procedure in successive fashion, character codes of the standard image patterns are successively stored at addresses of the memory 5-4 corresponding to the distances between the standard image patterns and the input image pattern. Thus, computations of the distance between the input image pattern and the standard image patterns corresponding to all of the character codes stored in the dictionary memory 5-1 end. When the results are stored at the addresses of the memory 5-4 that correspond to the respective items of distance data, the CPU 4 reads the character codes out of the memory 5-4 sequentially in order starting from the smallest address of the memory, i.e., starting from the character code of the character best approximating the input image pattern. These character codes or the stored character patterns themselves are displayed on the CRT display unit 7. In this way the operator is informed of the candidates for character recognition in accordance with the size of the computed distances. This is done by displaying the candidates in the order in which they best approximate the input image pattern, by way of example In this type of conventional sorting circuit used in a character recognition apparatus, the arrangement is such that the character code of the standard image pattern having the shortest distance with respect to one input image pattern is stored in memory with the distance data thereof serving as the address, as mentioned above. Therefore, in a case where distance data regarding a character "A" and a character "F" in the foregoing example indicates the same value, the content (the character "A" code data) stored at the address corresponding to the distance data relative to the standard image pattern of character code "A" computed at a preceding point in time will be rewritten as the character "F" code data which has the same distance data (address) computed at a later point in time. Consequently, the operator cannot be informed of the fact that two or more standard image patterns of character codes ("A" and "F" in this case) have the same distance data, i.e., all of them approximate the input image pattern in the same extent. Thus, the operator is informed of the fact that only "F", which is the result of the latter computation, is the character best approximating the input image pattern even though both "A" and "F" approximate it best. As a result, the conventional sorting circuit of a character recognition apparatus is defective in that the operator may not recognize a character correctly.

In order to solve this problem, consideration has been given to providing addresses of the identification storage memory 5-4 that correspond to all distance data regarding a single input image pattern with a plurality of storage areas (the maximum number of which would be the number of character codes stored in the dictionary memory 5-1) respectively. However, in a case where there are several hundred to several thousand character codes, the capacity of the memory 5-4 would have to be enormous (i.e., a memory capacity equivalent to the number of addresses multiplied by the number of character codes). This would give rise to new drawbacks, namely a higher cost for the apparatus and a longer memory access time.

SUMMARY OF THE INVENTION

An object of the present invention is to provide a sorting method and apparatus which solve the aforementioned problems.

Another object of the present invention is to provide a sorting method and apparatus through which the required memory capacity can be reduced and processing time greatly curtailed.

Still another object of the present invention is to provide a sorting method and apparatus which make it possible for identification codes corresponding to numeric data to be stored at high speed in the order of the numeric data.

A further object of the present invention is to provide a sorting method and apparatus which make it possible for identification codes stored in correspondence with numeric data to be read and outputted in the order of the numeric data.

Yet another object of the present invention is to provide an inexpensive sorting method and apparatus which make it possible to store all identification codes having the same numeric value data and to read out the identification codes corresponding to the numeric data at high speed in the order of the size of the numeric data.

According to the present invention, the foregoing objects are attained by providing a sorting method in which identification codes and numeric information to be sorted assigned to these identification codes are entered. In a case where there are a plurality of identification codes having the same numeric information, a first identification code among these identification codes is written in a first memory at an address corresponding to the numeric information, and identification codes from a second identification code onward having numeric information equal to said numeric information are written in a second memory at addresses corresponding to previously inputted identification codes. These stored identification codes are read out sequentially in the order of the sizes of the addresses of the first memory. When the first identification code has been stored at the address of the first memory, identification codes from the second onward having the same numeric information as the abovementioned identification code are read out of the second memory, with the stored identification code serving as a read starting address of the second memory and an identification code read out from the read starting address serving as the next read address.

The apparatus for practicing this sorting method in accordance with the invention comprises input means for inputting identification codes and numeric information to be sorted assigned to these identification codes, first memory means for storing the identification codes, with the numeric information serving as addresses, second memory means for storing identification codes from a second identification code onward having numeric information of the same value, with the identification codes serving as addresses, writing means which, in a case where there are a plurality of identification codes having equal numeric information, is for writing a first identification code among these identification codes in the first memory means at an address corresponding to the relevant numeric information, and for writing the identification codes from the second onward in the second memory means at addresses corresponding to previously inputted identification codes, and reading means for reading out the stored identification codes sequentially in the order of the sizes of the addresses of the first memory means and, when the first identification code has been stored at an address of the first memory means, for reading out, from the second memory means, identification codes from the second onward having the same numeric information as the abovementioned identification code, with the stored identification code serving as a read starting address of the second memory means and an identification code read out from the read starting address serving as the next read address.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 4 and 5 are flowcharts showing a control procedure executed by a CPU shown in FIG. 2.

DESCRIPTION OF THE PREFERRED EMBODIMENT

An embodiment of the present invention will now be described in detail with reference to the drawings.

Figure 1:
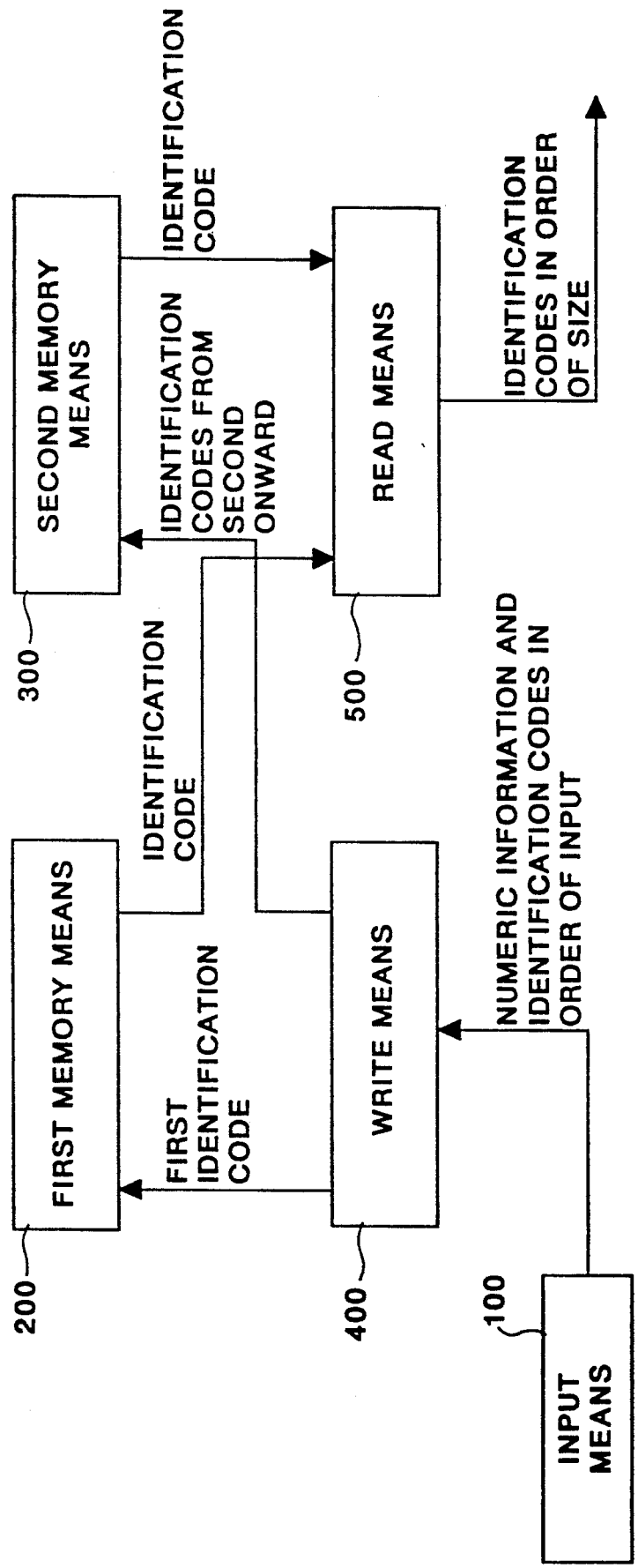
FIG. 1 is a block diagram illustrating the basic construction of an embodiment according to the present invention.

FIG. 1 is a functional block diagram showing the basic construction of an embodiment of the present invention.

The arrangement shown in FIG. 1 includes input means 100 for inputting numeric information to be sorted and identification codes assigned to this numeric information, first memory means 200 for storing the identification codes, with the numeric information serving as addresses, and second memory means 300 for storing identification codes from a second identification code onward having numeric information of the same value, with the abovementioned identification codes serving as addresses. The arrangement further includes writing means 400 for writing identification codes in the first memory means 200, with the numeric information serving as the addresses. In a case where a plurality of identification codes for which the relevant numeric information is the same are entered, the writing means 400 writes the identification codes from the second onward in the second memory means 300 at addresses that correspond to the previously entered identification codes. Also provided is reading means 500 for reading out identification codes in the order of the sizes of the addresses of the first memory means 200. When the first identification code has been stored at the address of the first memory means 200, the reading means 500 reads an identification code out of the second memory means 300, with the stored identification code serving as the read starting address of the second memory means 300. Then, with the identification code read out of this address serving as the next read address of the second memory 300, the reading means 500 reads out of the second memory 300 the identification codes, from the second identification code onward, that have the same numeric information as this identification code.

Figure 2:
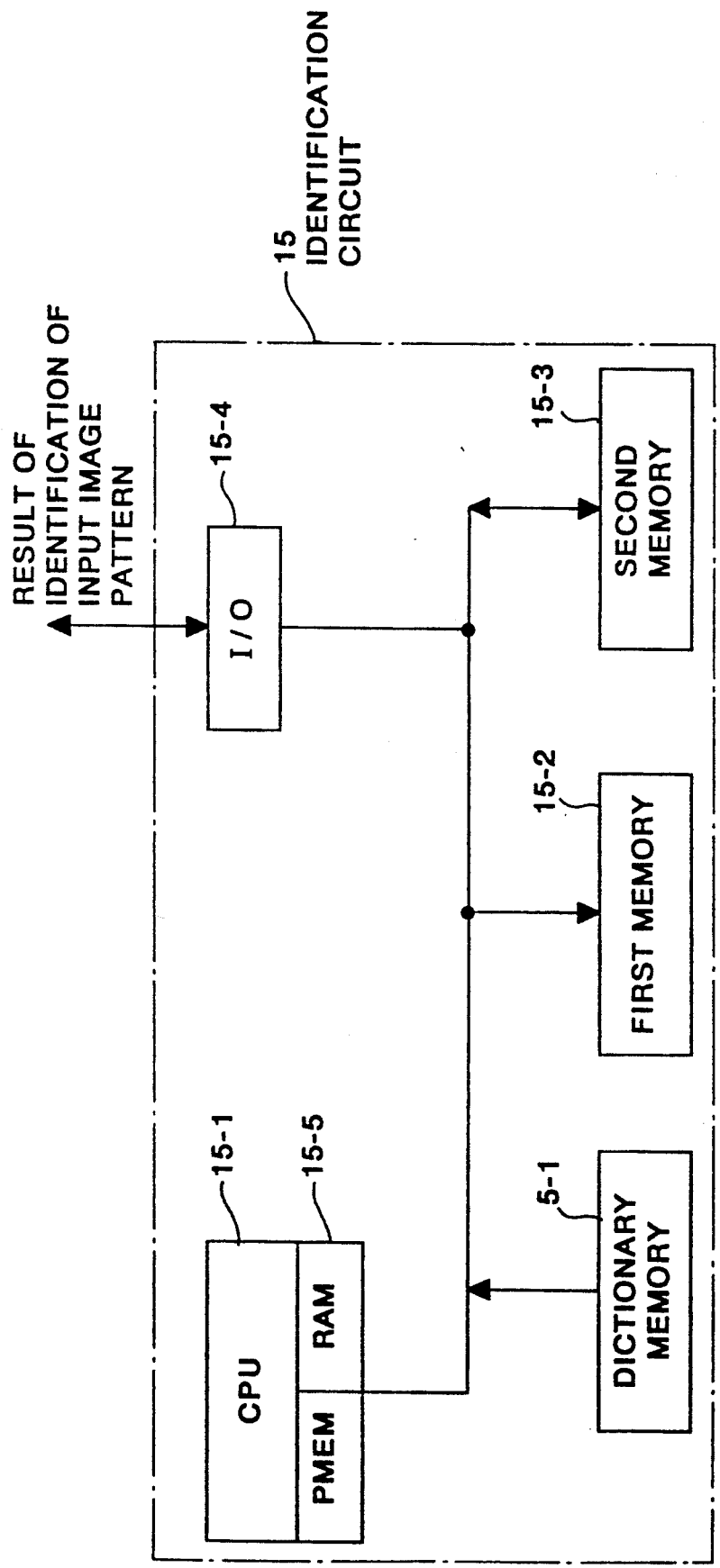
FIG. 2 is a circuit diagram showing the detailed construction of the embodiment of the invention.
Figure 6:
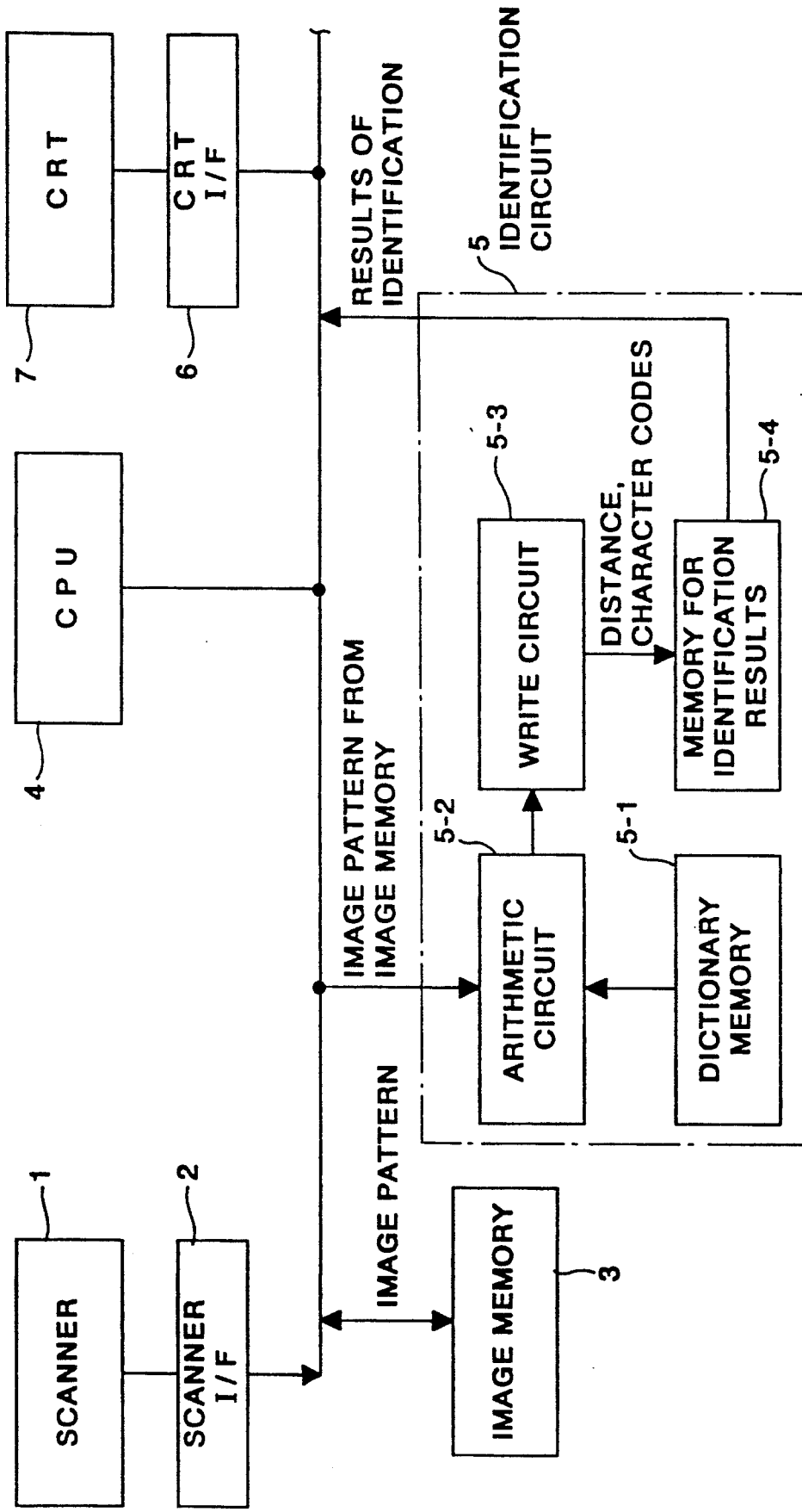
FIG. 6 is a block diagram showing the construction of a character recognition apparatus to which a conventional sorting circuit is applied.

FIG. 2 is a block diagram showing an example of the construction of an identification circuit 15 in a character recognition apparatus to which the present invention is applied. Other portions are similar to the prior-art example of FIG. 6 and therefore are deleted.

As shown in FIG. 2, numeral 15-1 represents a central processing unit (CPU) corresponding to the input means, writing means and reading means of the present invention. The CPU 15-1 performs a distance computation to determine the distance between an input image pattern which enters from an interface (I/O) 15-4 and standard image patterns stored in the dictionary memory 5-1. The dictionary memory 5-1 is similar to that of the prior-art example shown in FIG. 6. The CPU 15-1 has a program memory (PMEM) which stores a control procedure indicated by the flowcharts of FIGS. 4 and 5, and a RAM 15-5 which stores addresses.

Figure 3:
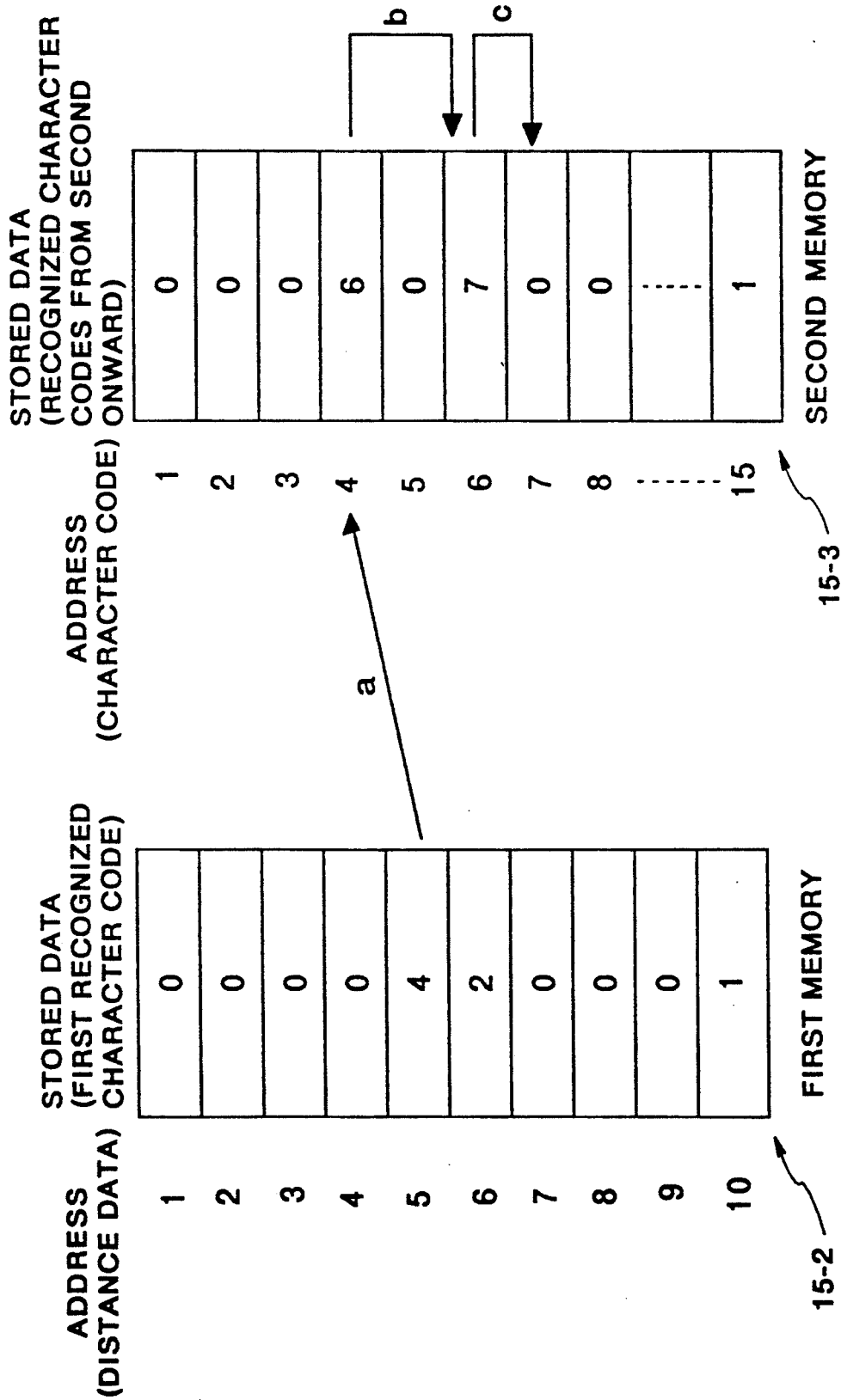
FIG. 3 is an explanatory view showing the principle of sorting in the embodiment of the invention.

Numeral 15-2 denotes a first memory (first memory means) in which the results (distance data) of the distance computation performed by the CPU 15-1 serve as addresses. as shown in FIG. 3. Identifiers (i.e., character codes) of the standard image patterns that have undergone the distance computation are stored at addresses which correspond to the results of the distance computation. Numeral 15-3 denotes a second memory (second memory means) in which the abovementioned character codes serve as addresses, as shown in FIG. 3. In a case where a plurality of identical results of distance computation are obtained, character codes generated from the second character code onward are stored.

Based on the results of computing the distance between the input image pattern and the standard image patterns from the dictionary memory 5-1, the CPU 15-1 writes the character codes of the standard image patterns which are the object of distance computation in either the first memory 15-2 or the second memory 15-3 in a manner described below. When the CPU 15-1 finishes computing the distance between one input image pattern and all of the standard image patterns and finishes writing the character codes in the first memory 15-2 or second memory 15-3, it reads the character codes out of the first memory 15-2 or second memory 15-3 in the order of the sizes of the computed distance values, e.g., in the order of increasing distance data (i.e., in the order in which the standard image patterns approximate the input image pattern) based on the contents stored in the first memory 15-2 and second memory 15-3, and then outputs the character codes to the CRT interface 6 via an interface 15-4.

Before describing the overall operation of the identification circuit 15, the principle of the sorting operation of the invention will be discussed based on FIG. 3.

FIG. 3 illustrates the address configurations of the first memory 15-2 and second memory 15-3 shown in FIG. 2. The sequence through which stored information is written and read is indicated by the arrows.

As shown in FIG. 3, the first memory 15-2 is such that numeric values which can be adopted as the results (distance data) of distance computation are assigned beforehand as addresses. In this example, the range of the results of distance computation is assumed to be "0" "10".

When identical distance data occur in the distance data computed by the CPU 15-1, only the initially extracted identifier, i.e., in this example, only the character code of the standard pattern used in the initial computation, is stored in the first memory 15-2 at the address corresponding to the results of the distance computation. Character codes of standard image patterns from the second onward having the same distance data are stored in the second memory 15-3. The second memory 15-3 is such that character codes which can be adopted as identifiers are served beforehand as addresses. In this example, "0"–"15" are assigned as character codes.

Each time one character is identified at the time of character identification, the storage areas of the first memory 15-2 and second memory 15-3 are cleared and "0" is written at each address as attribute information indicating that there is no stored information.

By way of example, assume that "5" is obtained as distance data as the result of distance computation, and that "4", "6", "7" are successively extracted as character codes of the standard patterns for which the distance data is "5". The character code "4" extracted first is stored in the first memory 15-2 at address "5", then the character code "6" extracted second is stored in the second memory 15-3 at address "4" (which corresponds to the character code "4") (see arrow a). Next, the character code "7" extracted third is stored in the second memory 15-3 at address "6"(which corresponds to the character code "6") (see arrow b).

Thus, in sequence starting from the initially extracted character code stored in the first memory 15-2, extracted character codes are successively stored in the second memory 15-3, at addresses each of which is designated by the immediately preceding character code, in the order in which the character codes were extracted.

In FIG. 3, the character code of the standard pattern for which the result of distance computation is "6" is "2". In a case where there is no standard pattern having the same distance data "6", nothing is written at address "2" of the second memory 15-3, so that this data stored here remains "0", as shown in FIG. 3. In this way it can be understood that there is only one standard character pattern for which the distance data is "6".

Next, in a case where character codes are read in the order of the sizes of the results of distance computation, namely in the order of increasing distance data, the CPU 15-1 determines whether character codes (data other than "0") in data areas of the first memory 15-2 are stored in order starting from the smallest address "1" of the first memory 15-2. In the case of FIG. 3, it is detected that the character code "4" has initially been stored at address "5". When this is done, the next character code is read out of the second memory 15-3 using the character code "4" as the address, then the next character code is read out of the data area of the second memory 15-3 using the abovementioned read character code as the address. This processing is executed repeatedly.

When the result of a reading operation is "0", this indicates that there is no character code to be read out next. Therefore, in FIG. 3, character codes "4", "6" and "7" can be read out in the order of arrows a → b → c. When the data at address "7" is detected to be "0", the checking processing shifts to the next address of the first memory 15-2. Here the character codes "4", "6", "7" are recognized as being codes having the same distance data "5".

Next, the second smallest distance data "6" is obtained as the result of distance computation. After the character code "2" of the corresponding standard pattern is extracted at the first memory 15-2, the address "2" of the second memory 15-3 is searched. Here, since the address "2" of the second memory 15-3 is "0", it is judged that there is no character code following the character code "2" that has the same distance data; hence, the content of address "7" of the first memory 15-2 is checked next.

Sorting processing according to the present embodiment based on the foregoing sorting principle will now be described with reference to the flowcharts of FIGS. 4 and 5.

FIG. 4 is a flowchart illustrating a control procedure for computing distance data and for writing character codes corresponding to the distance data in the first and second memories 15-2, 15-3. This is a control procedure executed by the CPU 15-1 based on the control program stored in the program memory (PMEM).

Figure 5:
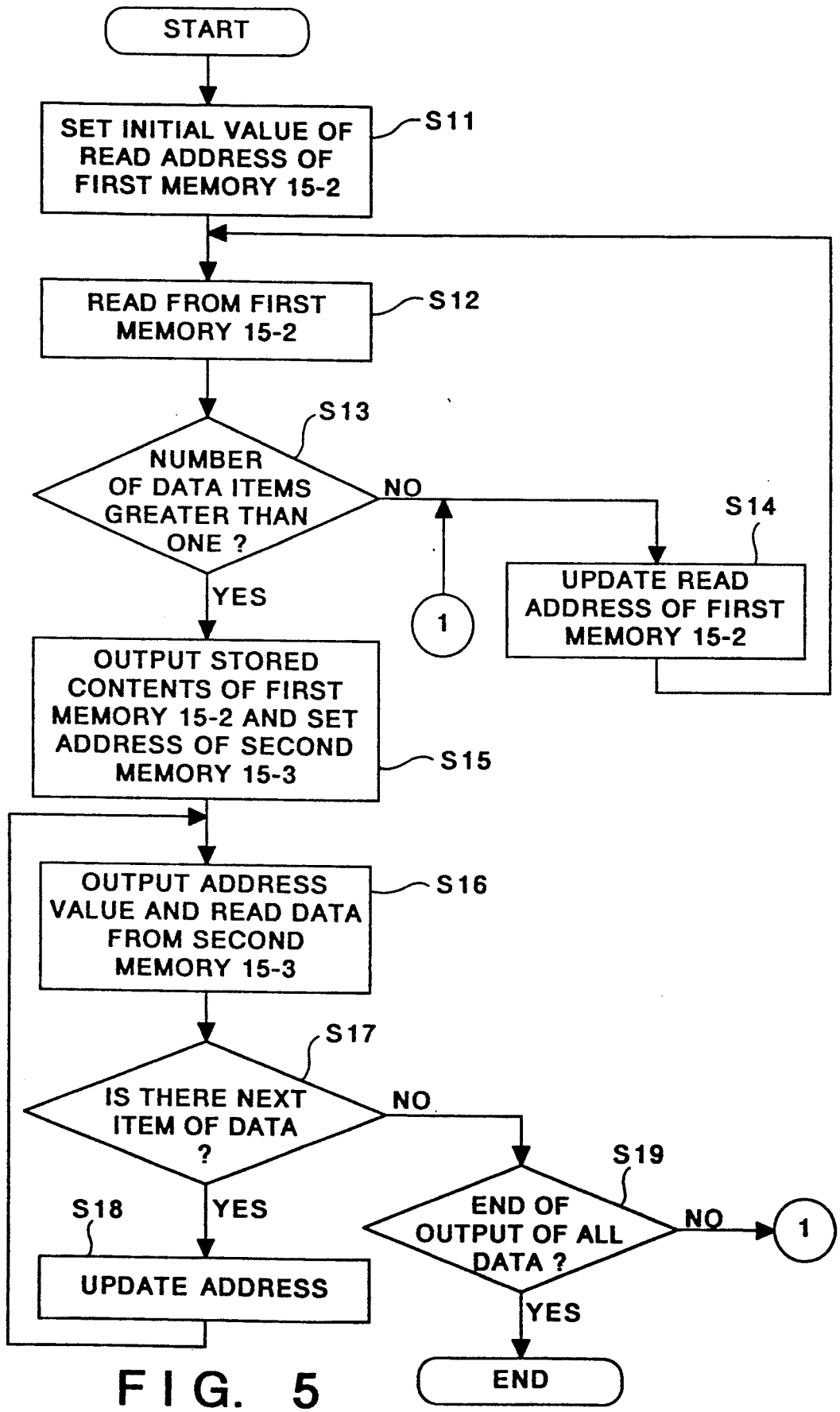

FIG. 5 is a flowchart illustrating a control procedure for reading character codes out of the first memory 15-2 and second memory 15-3 in the order of sorting. This control program is stored in the program memory (PMEM).

In FIG. 4, when the input image pattern of one character read by the scanner 1 (see FIG. 6) enters via the image memory 3 at step S1, the CPU 15-1 clears the first memory 15-2 and second memory 15-3, reads the first standard image pattern, e.g., the standard image pattern of character "A" (for which the character code is "1" in this example) out of the dictionary memory 5-1 at step S3, and performs a distance computation at step S3 to determine the distance between the standard pattern of character "A" and the input image pattern. This distance computation method is well known in the art and therefore is not described here.

Next, the CPU 15-1 accesses the first memory 15-2 using the result of distance computation (distance data) as an address. When the read address (distance data) of the first memory 15-2 is assumed to be "10", for example, and it is verified that the data area at address "10" is "0" at step S4, the CPU 15-1 stores the character code "1" corresponding to the character "A" in the memory area of address "10" (see FIG. 3) at step S8 and ends the first distance computation.

Next, the program proceeds to step S9, at which the CPU 15-1 updates the read address of the dictionary memory 5-1. If all distance computations have not ended ("NO" at step S10), the CPU 15-1 reads the next standard pattern, e.g., character "B" (for which the character code is assumed to be "2") out of the dictionary memory 5-1 at step S2, then computes the distance between the same input image pattern and the standard pattern for character "B" at step S3 in the same manner as the distance was computed with regard to the standard pattern for character "A".

When, say, the computed value "6" is obtained as a result, the CPU 15-1 writes the character code "2" of character "B" at the address "6" of the first memory 15-2 through a procedure similar to that described above.

Thereafter, the CPU 15-1 successively executes distance computations for computing the distance between each of the standard patterns and the first input pattern and successively writes the character codes of the standard patterns which were the object of distance computation in the first memory 15-2. Here only character codes for which the distance data is "10" or less are written.

Next, when the same result of distance computation, e.g., distance data "5", occurs in the distance computation involving the standard image pattern of the character whose character code is "6", the CPU 15-1 recognizes, at step S4, the fact that a plurality of character codes having the same distance data have been detected, this resulting from the fact that the character code "4" has already been stored at address "5" of the first memory 15-2. Accordingly, the program proceeds from step S4 to step S5. The CPU 15-1 sets the character code ("4" in the example of FIG. 3), written at address "5" of the first memory 15-2, as the read address of the second memory 15-3, and reads out the data at this set address. When the CPU 15-1 detects that the value is "0", namely that this is the final data of the character codes, at step S5, it stores the character code "6" at address "4" of the second memory 15-3 at step S7.

Thereafter, when the same distance data "5" is obtained even in the case of character code "7", the CPU read from the address "4" of the second memory 15-3. Since the character code "6" will have been stored at this address, the program proceeds from step S5 to step S6, so that the value of the next address "6" is read out based on the above-described procedure. Here the value of address "6" is "0". Therefore, the program proceeds to step S7, so that the character code "7" is stored at address "6" of the second memory 15-3.

Thus, the foregoing procedure is successively repeated until the end of processing for computing the distance data regarding the last standard pattern in dictionary memory 5-1 and for storing the results of these computation. When this processing is terminated, the present control procedure for writing data ends (step S10).

This is followed by execution of the control procedure of FIG. 5 for reading out data performed by the CPU 15-1.

The CPU 15-2 sets the read address of the first memory 15-2 to "1" as an initial value at step S11 and then reads a character code out of the first memory 15-2 at step S12. If a character code has not been stored, i.e., if the result of the read-out operation at step S12 is "0" ("NO" at step S13), the read address of the first memory 15-2 is updated at step S14 on the grounds that there is no character code having the corresponding distance data. The program then proceeds from step S14 back to step S12.

In the case of this example, the character code "4" having the distance data "5" is read out at the moment the read address of the first memory 15-2 becomes "5" (see FIG. 3), and the character code "4" is outputted by the identification circuit 15. The character of this character code "4" is displayed on the CRT display unit 7 as a first character recognition candidate with regard to the input character pattern. This processing is executed at steps S13, S15 and S16.

Based on the above-described processing, the character code "7" is read out of the second memory 15-3 following the character code "6" having the same distance data as that of the character code "4", and the character of this character code is displayed on the CRT display unit 7 in the manner described above. This processing is executed at steps S17, S18, S16, S17.

This procedure is successively repeated so that the CPU 15-1 successively outputs and displays character codes regarding one input image pattern on the CRT display unit 7 in the order of the candidates (i.e., the order in which the characters of the character codes approximate the input image pattern). When all of the character codes for which the distance data is less than "10", by way of example, are thus outputted and displayed, the CPU 15-1 accepts the next input image pattern from the scanner 1 and repeats the character recognition procedure described above.

It should be noted that it is permissible to adopt an arrangement in which all character codes or character patterns which are recognition candidates with regard to one input image pattern are displayed in the order of the candidates. If it is desired to raise the recognition speed, an arrangement can be adopted in which the distance data is provided with a threshold value and only character candidates having distance data smaller than the threshold value are outputted. In such case, it will suffice if the addresses of the first memory 15-2 are set from "1" to the threshold value.

In the present embodiment, an example has been described in which the invention is applied to a character recognition apparatus. However, the invention can be applied also to a sorting circuit for sorting and outputting, say, test scores and the names of students in the order of the scores, and to an apparatus in which numeral data and identification codes corresponding to the numeral data are sorted in the order of size.

Further, in the present embodiment, the address configurations of the dictionary memory 5-1 and the second memory 15-3 are such that accessing is performed by character code. This makes it possible to arrange the addresses in the same memory space. If the dictionary memory 5-1 and second memory 15-3 are integrated by making use of this feature, it will suffice to set the read addresses only once. This makes it possible to raise the speed of the sorting and the character recognition.

For the sake of reference, the memory capacity of the conventional sorting circuit and the memory capacity of the present embodiment will be compared. For example, assume that there are ten values which can be adopted as computed distance values and that there are 15 character codes. In such case, the memory capacity required in the prior-art example would be that needed to store $10 \times 15 = 150$ items of data. By contrast, it will suffice if the memory capacity in the present embodiment is large enough to store $10 + 15 = 25$ items of data. Since the number of character codes in an actual character recognition apparatus is on the order of several hundred to several thousand, the effectiveness of the invention is enormous in terms of reducing required memory capacity.

Since the present embodiment thus makes it possible to greatly reduce required memory capacity in comparison with the prior art, the apparatus can be lowered in cost. In addition, since there are fewer items of data to be written and read, character recognition speed is raised.

As many apparently widely different embodiments of the present invention can be made without departing from the spirit and scope thereof, it is to be understood that the invention is not limited to the specific embodiments thereof except as defined in the appended claims.

What is claimed is:

1. A character recognition method comprising the steps of:

inputting a character pattern to be recognized;

computing distance data between the input character pattern and each of a plurality of stored standard character patterns and determining a class of similarity based on the values of the computed distance data between the input character pattern and the stored standard character patterns, whereby the stored standard character patterns belonging to the class of similarity determined according to a smallest value of the computed distance data are most similar to the input character pattern;

accessing a first memory at an address that corresponds to the determined class of similarity;

determining if the address of the first memory corresponding to the determined class of similarity is occupied;

storing a character code of the standard character pattern having the determined class of similarity into the first memory at the address corresponding to the determined class of similarity, when the address is not occupied;

reading out the character code stored in the first memory at the address corresponding to the determined class of similarity and accessing a second memory at an address corresponding to the read character code if a character code has already been stored in the first memory at the address corresponding to the determined class of similarity;

determining if the address of the second memory corresponding tot he character code read from the first memory is occupied;

storing a character code of the standard character pattern having the determined class of similarity into the second memory at an address corresponding to the read character code from the first memory, when the address of the second memory is not occupied; and successively searching, when a character code has already been stored at the address of the second memory corresponding to a reach character code, the addresses of the second memory that correspond to the already stored character codes, and when an address of the second memory at which a character code is not stored is found, storing the character code of the standard character pattern at that address.

2. A character recognition method according to claim 1, wherein the address corresponding to the class of similarity is distance data.

3. A character recognition method comprising the steps of:

inputting a character pattern to be recognized;

computing distance data between the input character pattern and each of a plurality of stored standard character patterns and determining a class of similarity based on the values of the computed distance data between the input character pattern and the stored standard character patterns, whereby the stored standard character patterns belonging to the class of similarity determined according to a smallest value of the computed distance data are most similar to the input character pattern;

accessing a first memory at an address that corresponds to the determined class of similarity;

determining if the address of the first memory corresponding to the determined class of similarity is occupied;

storing a character code of the standard character pattern having the determined class of similarity into the first memory at the address corresponding to the determined class of similarity, when the address is not occupied;

reading out the character code stored in the first memory at the address corresponding to the determined class of similarity and accessing a second memory at an address corresponding to the read character code if a character code has already been stored in the first memory at the address corresponding to the determined class of similarity;

determining if the address of the second memory corresponding tot he character code read from the first memory is occupied;

storing a character code of the standard character pattern having the determined class of similarity into the second memory at an address corresponding to the read character code from the first memory, when the address of the second memory is not occupied;

successively searching, when a character code has already been stored at the address of the second memory corresponding to a reach character code, the addresses of the second memory that correspond to the already stored character codes, and when an address of the second memory at which a character code is not stored is found, storing the character code of the standard character pattern at that address;

reading out the contents of the first memory starting from an initial address, after the distance data between the input character pattern and each of all of the stored standard character patterns is computed, the classes of similarity of the input character pattern to the stored standard character patterns are determined and the character codes of the classes have been stored into the first and second memories;

reading out a content of the second memory at an address corresponding to a character code stored in the first memory at the address corresponding to the determined class of similarity, when the address of the first memory is occupied;

determining if the address of the second memory is occupied, and if so, repeatingly reading out the contents of the second memory at addresses corresponding to the contents read from the second memory until an address of the second memory is not occupied, to get all standard character codes belonging to a class of similarity; and outputting all of the contents read from the first and second memory as character codes of standard characters belonging to the determined class of similarity.

4. A character recognition method according to claim 3, wherein the address corresponding to the class of similarity is distance data.

5. A character recognition method according to claim 3, wherein said method is performed to get all character codes belonging to all of the classes of similarity.

6. A character recognition method according to claim 5, wherein said method is performed in ascending order according to the values of the classes of similarity to get all character codes of standard characters belonging to a class of similarity.

7. A character recognition apparatus comprising:

input means for inputting a character pattern to be recognized;

pattern memory means for storing a plurality of standard character patterns;

class determining means for computing distance data between the input character pattern and each of a plurality of the stored standard character patterns, and for determining a class of similarity based on the values of the computed distance data between the input character pattern and the stored standard character patterns, whereby the stored standard character patterns belonging to the class of similarity determined according to a smallest value of the computed distance data are most similar to the input character pattern;

first memory means having memory space corresponding to the number of classes determined by said class determining means, for storing a character code of a standard character pattern having the determined class at an address corresponding to the determined class of similarity;

second memory means having memory space corresponding to the number of character codes, for storing character codes at an address corresponding to a character code;

first accessing means for accessing said first memory means at an address corresponding to the class determined by said class determining means, and for storing the character code of the standard character pattern having the determined class of similarity into the first memory means at the corresponding address, when the corresponding address of said first memory means is not occupied;

second accessing means, activated if a character code has already been stored in said first memory means when said first accessing means accesses said first memory means, for reading out the stored character code from said first memory means and accessing said second memory means using the read character code as an address, and for storing the character code of the standard character pattern having the determined class of similarity into said second memory means at the address, when the address of said second memory means is not occupied; and third accessing means activated if a character code has already been stored in said second memory means when the second accessing means accesses said second memory means, for reading out the stored character code from said second memory means and successively accessing said second memory means using a character code read out from said second memory means as an address, and for storing the character code of the standard character pattern having the determined class of similarity into said second memory means at the address, when the address of said second memory means is not occupied.

8. A character recognition apparatus according to claim 7, wherein an address corresponding to the class of similarity is the distance data.

9. A character recognition apparatus according to claim 7, further comprising;

fourth accessing means for reading out the contents of said first memory means starting from an initial address, after the distance data between the input character pattern and each of all of the stored standard character patterns is computed, the classes of similarity of the input character pattern to the stored standard character patterns are determined and the character codes of the classes have been stored into said first and second memory means;

fifth accessing means for reading out the contents of said second memory means at an address corresponding to the contents of said first memory means when the address of said first memory means is occupied when being accessed by the fourth accessing means;

sixth accessing means, if the address of said second memory means is occupied, for reading out the contents of said second memory means at addresses corresponding to the contents read from said second memory means, and for repeating the process on said second memory means until the address of said second memory means is not occupied; and output means for outputting all of the contents read from said first and second memory means by said fourth, fifth and sixth accessing means, as character codes of standard characters belonging to a class of similarity.

* * * * *

UNITED STATES PATENT AND TRADEMARK OFFICE
CERTIFICATE OF CORRECTION

PATENT NO. : 5,226,174

DATED : July 6, 1993

INVENTOR(S) : TOSHIAKI YAGASAKI, ET AL.

It is certified that error appears in the above-identified patent and that said Letters Patent is hereby corrected as shown below:

On the title page,
IN [54] TITLE

"COMPUTER" should read --COMPUTED--.

COLUMN 1

Line 4, "COMPUTER" should read --COMPUTED--.

COLUMN 2

Line 42, "example" should read --example.--.

COLUMN 6

Line 12, ""0"" should read --"0"- --.
Line 66, close up right margin.
Line 67, close up left margin.

COLUMN 8

Line 26, "step S5-" should read --step S5.--.

COLUMN 10

Line 42, "tot he" should read --to the--.
Line 52, "reach" should read --read--.

UNITED STATES PATENT AND TRADEMARK OFFICE
CERTIFICATE OF CORRECTION

PATENT NO. : 5,226,174

DATED : July 6, 1993

INVENTOR(S) : TOSHIAKI YAGASAKI, ET AL.

It is certified that error appears in the above-identified patent and that said Letters Patent is hereby corrected as shown below:

<u>COLUMN 11</u>

Line 25, "tot he" should read --to the--.

Signed and Sealed this

Twenty-fourth Day of May, 1994

Attest:

BRUCE LEHMAN

Attesting Officer

Commissioner of Patents and Trademarks